United States Patent
Stern et al.

(10) Patent No.: US 12,004,508 B2
(45) Date of Patent: Jun. 11, 2024

(54) CONCENTRATED LOW VISCOSITY AGRICULTURAL FORMULATIONS

(71) Applicant: Indorama Ventures Oxides LLC, The Woodlands, TX (US)

(72) Inventors: Alan J. Stern, Magnolia, TX (US); Matthew T. Meredith, Spring, TX (US); Zhidong Wang, Shanghai (CN); Rowan Brown, Ascot Vale (AU)

(73) Assignee: Indorma Ventures Oxides LLC, The Woodlands, TX (US)

( * ) Notice: Subject to any disclaimer, the term of this patent is extended or adjusted under 35 U.S.C. 154(b) by 188 days.

(21) Appl. No.: 15/761,946

(22) PCT Filed: Feb. 22, 2017

(86) PCT No.: PCT/US2017/018860
§ 371 (c)(1),
(2) Date: Mar. 21, 2018

(87) PCT Pub. No.: WO2017/155694
PCT Pub. Date: Sep. 14, 2017

(65) Prior Publication Data
US 2018/0360026 A1 Dec. 20, 2018

Related U.S. Application Data

(60) Provisional application No. 62/411,748, filed on Oct. 24, 2016, provisional application No. 62/305,163, filed on Mar. 8, 2016.

(51) Int. Cl.
| | | |
|---|---|---|
| *A01N 25/04* | (2006.01) |
| *A01N 25/30* | (2006.01) |
| *A01N 37/22* | (2006.01) |
| *A01N 43/707* | (2006.01) |
| *C08G 81/02* | (2006.01) |
| *C08L 79/02* | (2006.01) |
| *C09B 67/46* | (2006.01) |
| *C09D 11/03* | (2014.01) |

(52) U.S. Cl.
CPC ............ *A01N 25/04* (2013.01); *A01N 25/30* (2013.01); *A01N 37/22* (2013.01); *A01N 43/707* (2013.01); *C08G 81/021* (2013.01); *C08G 81/025* (2013.01); *C08L 79/02* (2013.01); *C09B 67/009* (2013.01); *C09D 11/03* (2013.01); *C08L 2201/56* (2013.01)

(58) Field of Classification Search
None
See application file for complete search history.

(56) References Cited

U.S. PATENT DOCUMENTS

| | | | |
|---|---|---|---|
| 3,654,370 A | 4/1972 | Yeakey | |
| 4,152,353 A | 5/1979 | Habermann | |
| 4,348,385 A | 9/1982 | Synek | |
| 4,618,717 A | 10/1986 | Renken et al. | |
| 4,766,245 A | 8/1988 | Larkin et al. | |
| 4,960,942 A | 10/1990 | Gerkin et al. | |
| 4,973,761 A | 11/1990 | Schoenleben et al. | |
| 5,003,107 A | 3/1991 | Zimmerman et al. | |
| 5,352,835 A | 10/1994 | Dai et al. | |
| 5,422,042 A | 6/1995 | Waddill et al. | |
| 5,457,147 A | 10/1995 | McGrath et al. | |
| 2007/0244216 A1* | 10/2007 | Stern | C08F 257/02 523/122 |
| 2008/0119613 A1 | 5/2008 | Klein et al. | |
| 2010/0029834 A1 | 2/2010 | Gobelt et al. | |
| 2010/0130678 A1* | 5/2010 | Richards | C08F 8/32 524/608 |
| 2010/0227010 A1 | 9/2010 | Jones | |
| 2012/0264610 A1* | 10/2012 | Stern | C08L 79/04 514/772.1 |
| 2013/0289185 A1 | 10/2013 | Oya et al. | |

FOREIGN PATENT DOCUMENTS

| | | | |
|---|---|---|---|
| JP | 2009-530289 A | 8/2009 |
| WO | 0075194 A1 | 12/2000 |
| WO | 2007/109051 A2 | 9/2007 |
| WO | 2010/121976 A2 | 10/2010 |
| WO | 2012/091050 A1 | 7/2012 |

OTHER PUBLICATIONS

Kumari et al. (Int. J. of Plastics Technology, 2011, 15, Abstract only (Year: 2011).*
Anonymous, "The JEFFAMINE® Polyetheramines", www.huntsman.com, Copyright 2007, Huntsman Corporation or an affiliate thereof, All rights reserved, 6 pages.

* cited by examiner

*Primary Examiner* — Erin E Hirt
(74) *Attorney, Agent, or Firm* — Christensen, Fonder, Dardi & Herbert PLLC

(57) ABSTRACT

The present disclosure provides a dispersant obtained from the reaction of a styrene maleic anhydride and a polyether monoamine. The dispersant may be combined with a pesticide and water to form an aqueous agricultural composition.

8 Claims, 2 Drawing Sheets

CONCENTRATED LOW VISCOSITY AGRICULTURAL FORMULATIONS

CROSS REFERENCE TO RELATED APPLICATIONS

This application claims the benefit of U.S. Provisional Patent Application Ser. No. 62/411,748, filed Oct. 24, 2016 and U.S. Provisional Patent Application Ser. No. 62/305,163, filed Mar. 8, 2016, the entire disclosures of which are incorporated herein by reference.

STATEMENT REGARDING FEDERALLY SPONSORED RESEARCH OR DEVELOPMENT

Not applicable.

FIELD OF THE INVENTION

The present disclosure generally relates to dispersants for use in agricultural applications. In particular, the dispersant of the present disclosure is a product obtained from the reaction of a styrene maleic anhydride copolymer and a polyether monoamine.

BACKGROUND

The active ingredients in many agricultural applications are largely hydrophobic or water insoluble in character and are, by necessity, often administered as finely divided solids suspended in aqueous media. The majority of these active ingredients are manufactured and marketed in concentrated form, possibly with the addition of other insoluble inert fillers, which are then diluted prior to application. For example, the active ingredient is typically available in the form of a suspension concentrate (SC), wettable powder (WP) or water dispersible granule (WG). However, due to the generally hydrophobic nature of the active ingredient, the addition of a suitable dispersant is essential in order to achieve a homogenous dispersion with minimum mixing such as may be achieved readily by hand or with minimal mechanical mixing. Furthermore, once a homogenous dispersion is achieved, the resulting suspension must remain stable for a sufficient time, at least, to allow application by usual means such as spraying. Any settling, agglomeration or flocculation of the finely divided solid may lead to inconsistent and ineffective application as well as blockage of the spraying equipment. It is therefore necessary to provide a dispersant which provides a homogenous dispersion and a suspension which maintains its stability during the application of the aqueous dispersion.

Currently used dispersants for SC formulations include ethylene oxide/propylene oxide block copolymer surfactants based on a hydrophobic moiety plus ethyleneoxide. Also used are ether phosphate derivatives of non-ionic surfactants, especially of tristyrylphenol ethoxylates. Conventional anionic surfactants used include sulphonated derivatives of arylformaldehyde condensates, polyacrylates and lignosulfonates.

Dispersants for WP and WG formulations are usually limited by the requirements that the dispersant be solid at ambient temperatures, be non-gelling and not dissolve the active principle. For these reasons, conventional non-ionic surfactants are often unsuitable, and anionic dispersants are preferred. Known effective dispersants for WP and WG formulations include sulphonated alkylnaphthalene/formaldehyde condensate salts and lignosulfonate salts.

It would be advantageous to provide new dispersants which not only address or reduce stability issues with partially water-soluble active ingredients, but also improve the shelf-life of suspension concentrates.

SUMMARY

The present disclosure provides a dispersant obtained from the reaction of a styrene maleic anhydride copolymer and a polyether monoamine. The dispersant of the present disclosure may be used in aqueous agricultural compositions as well as in pigment, ink or dye formulations.

DETAILED DESCRIPTION

Figure 1:
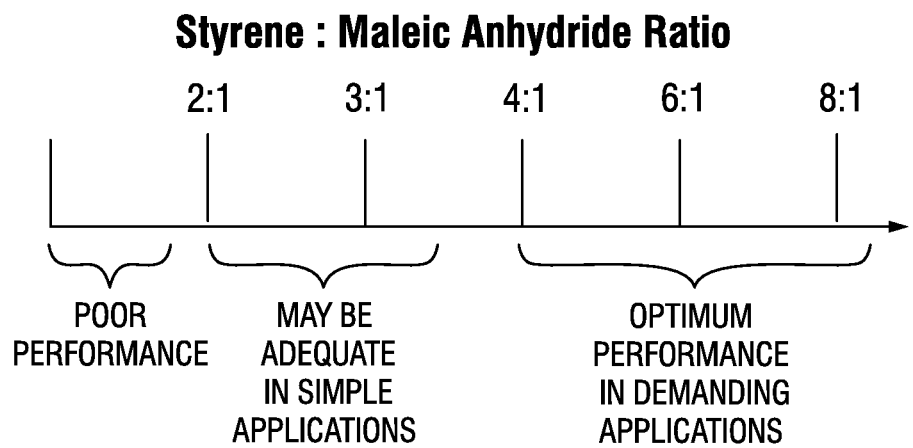
FIG. 1 depicts the effect of the styrene to maleic anhydride molar ratio with respect to dispersant performance.

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, except those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical objects of the article. By way of example, "an amine" means one amine or more than one amine. The phrases "in one aspect", "according to one aspect" and the like generally mean the particular feature, structure, or characteristic following the phrase is included in at least one embodiment of the present disclosure, and may be included in more than one embodiment of the present disclosure. Importantly, such phrases do not necessarily refer to the same embodiment. If the specification states a component or feature "may", "can", "could", or "might" be included or have a characteristic, that particular component or feature is not required to be included or have the characteristic.

The term "Ostwald ripening" refers to coarsening of a precipitate or solid particle dispersed in a medium and is the final stage of phase separation in a solution, during which the larger particles of the precipitate or the solid particle grow at the expense of the smaller particles, which disappear.

The term "suspension concentrate composition" and derivative terms refer to compositions comprising finely divided solid particles of a pesticide dispersed in water. Said particles retain identity and can be physically separated from liquid.

The term "pesticide" refers to at least one pesticide selected from the group consisting of a fungicide, insecticide, nematicide, herbicide, a safener, a plant growth regulator and a mixture thereof. In one particular aspect, the pesticide is selected from the group consisting of a fungicide, an insecticide, a herbicide and a mixture thereof. The person skilled in the art is familiar with such pesticides, which can be found in, for example, the Pesticide Manual, 15th Ed. (2011), The British Crop Protection Council, London.

Fungicides mean active ingredients that kill, control or otherwise adversely modify the growth of fungal pathogen. Examples of fungicides that can be employed in the present disclosure include, but are not limited to: (3-ethoxypropyl)-mercury bromide, 2-methoxyethylmercury chloride, 2-phenylphenol, 8-hydroxyquinoline sulfate, 8-phenylmercurioxyquinoline, acibenzolar, acibenzolar-S-methyl, acypetacs, acypetacs-copper, acypetacs-zinc, aldimorph, allyl alcohol, ametoctradin, amisulbrom, ampropylfos, anilazine, aureofungin, azaconazole, azithiram, azoxystrobin, barium polysulfide, benalaxyl, benalaxyl-M, benodanil, benomyl, benquinox, bentaluron, benthiavalicarb, benthiavalicarb-isopropyl, benzalkonium chloride, benzamacril, benzamacril-isobutyl, benzamorf, benzohydroxamic acid, bethoxazin, binapacryl, biphenyl, bitertanol, bithionol, bixafen, blasticidin-S, Bordeaux mixture, boscalid, bromuconazole, bupirimate, Burgundy mixture, buthiobate, butylamine, calcium polysulfide, captafol, captan, carbamorph, carbendazim, carboxin, carpropamid, carvone, Cheshunt mixture, chinomethionat, chlobenthiazone, chloraniformethan, chloranil, chlorfenazole, chlorodinitronaphthalene, chloroneb, chloropicrin, chlorothalonil, chlorquinox, chlozolinate, climbazole, clotrimazole, copper acetate, copper carbonate, basic, copper hydroxide, copper naphthenate, copper oleate, copper oxychloride, copper silicate, copper sulfate, copper zinc chromate, cresol, cufraneb, cuprobam, cuprous oxide, cyazofamid, cyclafuramid, cycloheximide, cyflufenamid, cymoxanil, cypendazole, cyproconazole, cyprodinil, dazomet, dazomet-sodium, DBCP, debacarb, decafentin, dehydroacetic acid, dichlofluanid, dichlone, dichlorophen, dichlozoline, diclobutrazol, diclocymet, diclomezine, diclomezine-sodium, dicloran, diethofencarb, diethyl pyrocarbonate, difenoconazole, diflumetorim, dimethirimol, dimethomorph, dimoxystrobin, diniconazole, diniconazole-M, dinobuton, dinocap, dinocap-4, dinocap-6, dinocton, dinopenton, dinosulfon, dinoterbon, diphenylamine, dipyrithione, disulfiram, ditalimfos, dithianon, DNOC, DNOC-ammonium, DNOC-potassium, DNOC-sodium, dodemorph, dodemorph acetate, dodemorph benzoate, dodicin, dodicin-sodium, dodine, drazoxolon, edifenphos, epoxiconazole, etaconazole, etem, ethaboxam, ethirimol, ethoxyquin, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulf, fenapanil, fenarimol, fenbuconazole, fenfuram, fenhexamid, fenitropan, fenoxanil, fenpiclonil, fenpropidin, fenpropimorph, fentin, fentin chloride, fentin hydroxide, ferbam, ferimzone, fluazinam, fludioxonil, flumetover, flumorph, fluopicolide, fluopyram, fluoroimide, fluotrimazole, fluoxastrobin, fluquinconazole, flusilazole, flusulfamide, flutianil, flutolanil, flutriafol, fluxapyroxad, folpet, formaldehyde, fosetyl, fosetyl-aluminium, fuberidazole, furalaxyl, furametpyr, furcarbanil, furconazole, furconazole-cis, furfural, furmecyclox, furophanate, glyodin, griseofulvin, guazatine, halacrinate, hexachlorobenzene, hexachlorobutadiene, hexaconazole, hexylthiofos, hydrargaphen, hymexazol, imazalil, imazalil nitrate, imazalil sulfate, imibenconazole, iminoctadine, iminoctadine triacetate, iminoctadine trialbesilate, iodomethane, ipconazole, iprobenfos, iprodione, iprovalicarb, isoprothiolane, isopyrazam, isotianil, isovaledione, kasugamycin, kresoxim-methyl, mancopper, mancozeb, mandipropamid, maneb, mebenil, mecarbinzid, mepanipyrim, mepronil, meptyldinocap, mercuric chloride, mercuric oxide, mercurous chloride, metalaxyl, metalaxyl-M, metam, metam-ammonium, metam-potassium, metam-sodium, metazoxolon, metconazole, methasulfocarb, methfuroxam, methyl bromide, methyl isothiocyanate, methylmercury benzoate, methylmercury dicyandiamide, methylmercury pentachlorophenoxide, metiram, metominostrobin, metrafenone, metsulfovax, milneb, myclobutanil, myclozolin, N-(ethylmercury)-p-toluene-sulphonanilide, nabam, natamycin, nitrostyrene, nitrothal-isopropyl, nuarimol, OCH, octhilinone, ofurace, orysastrobin, oxadixyl, oxine-copper, oxpoconazole, oxpoconazole fumarate, oxycarboxin, pefurazoate, penconazole, pencycuron, penflufen, pentachlorophenol, penthiopyrad, phenylmercuriurea, phenylmercury acetate, phenylmercury chloride, phenylmercury derivative of pyrocatechol, phenylmercury nitrate, phenylmercury salicylate, phosdiphen, phthalide, picoxystrobin, piperalin, polycarbamate, polyoxins, polyoxorim, polyoxorim-zinc, potassium azide, potassium polysulfide, potassium thiocyanate, probenazole, prochloraz, procymidone, propamocarb, propamocarb hydrochloride, propiconazole, propineb, proquinazid, prothiocarb, prothiocarb hydrochloride, prothioconazole, pyracarbolid, pyraclostrobin, pyraclostrobin, pyrametostrobin, pyraoxystrobin, pyrazophos, pyribencarb, pyridinitril, pyrifenox, pyrimethanil, pyriofenone, pyroquilon, pyroxychlor, pyroxyfur, quinacetol, quinacetol sulfate, quinazamid, quinconazole, quinoxyfen, quintozene, rabenzazole, salicylanilide, sedaxane, silthiofam, simeconazole, sodium azide, sodium orthophenylphenoxide, sodium pentachlorophenoxide, sodium polysulfide, spiroxamine, streptomycin, sulfur, sultropen, TCMTB, tebuconazole, tebufloquin, tecloftalam, tecnazene, tecoram, tetraconazole, thiabendazole, thiadifluor, thicyofen, thifluzamide, thiochlorfenphim, thiomersal, thiophanate, thiophanate-methyl, thioquinox, thiram, tiadinil, tioxymid, tolclofos-methyl, tolylfluanid, tolylmercury acetate, triadimefon, triadimenol, triamiphos, triarimol, triazbutil, triazoxide, tributyltin oxide, trichlamide, tricyclazole, tridemorph, trifloxystrobin, triflumizole, triforine, triticonazole, uniconazole, uniconazole-P, validamycin, valifenalate, vinclozolin, zarilamid, zinc naphthenate, zineb, ziram, zoxamide and mixtures thereof.

Insecticides mean active ingredients that kill, control or otherwise adversely modify the growth of insects. Examples of insecticides that can be employed in the present disclosure include, but are not limited to: 1,2-dichloropropane, abamectin, acephate, acetamiprid, acethion, acetoprole, acrinathrin, acrylonitrile, alanycarb, aldicarb, aldoxycarb, aldrin, allethrin, allosamidin, allyxycarb, alpha-cypermethrin, alpha-ecdysone, alpha-endosulfan, amidithion, aminocarb, amiton, amiton oxalate, amitraz, anabasine, athidathion, azadirachtin, azamethiphos, azinphos-ethyl, azinphos-methyl, azothoate, barium hexafluorosilicate, barthrin, bendiocarb, benfuracarb, bensultap, beta-cyfluthrin, beta-cypermethrin, bifenthrin, bioallethrin, bioethanomethrin, biopermethrin, bistrifluoron, borax, boric acid, bromfenvinfos, bromocyclen, bromo-DDT, bromophos, bromophos-ethyl, bufencarb, buprofezin, butacarb, butathiofos, butocarboxim, butonate, butoxycarboxim, cadusafos, calcium arsenate, calcium polysulfide, camphechlor, carbanolate, carbaryl, carbofuran, carbon disulfide, carbon tetrachloride, carbophenothion, carbosulfan, cartap, cartap hydrochloride, chlorantraniliprole, chlorbicyclen, chlordane, chlordecone, chlordimeform, chlordimeform hydrochloride, chlorethoxyfos, chlorfenapyr, chlorfenvinphos, chlorfluazuron, chlormephos, chloroform, chloropicrin, chlorphoxim, chlorprazophos, chlorpyrifos, chlorpyrifos-methyl, chlorthiophos, chromafenozide, cinerin I, cinerin II, cinerins, cismethrin, cloethocarb, closantel, clothianidin, copper acetoarsenite, copper arsenate, copper naphthenate, copper oleate, coumaphos, coumithoate, crotamiton, crotoxyphos, crufomate, cryolite, cyanofenphos, cyanophos, cyanthoate, cyantraniliprole, cyclethrin, cycloprothrin, cyfluthrin, cyhalothrin, cypermethrin, cyphenothrin, cyromazine, cythioate, DDT, decarbofuran, deltamethrin, demephion, demephion-O, demephion-S, demeton, demeton-methyl, demeton-O, demeton-O-methyl, demeton-S, demeton-S-methyl, demeton-S-methylsulphon, diafenthiuron, dialifos, diatomaceous earth, diazinon, dicapthon, dichlofenthion, dichlorvos, dicresyl, dicrotophos, dicyclanil, dieldrin, diflubenzuron, dilor, dimefluthrin, dimefox, dimetan, dimethoate, dimethrin, dimethylvinphos, dimetilan, dinex, dinex-diclexine, dinoprop, dinosam, dinotefuran, diofenolan, dioxabenzofos, dioxacarb, dioxathion, disulfoton, dithicrofos, d-limonene, DNOC, DNOC-ammonium, DNOC-potassium, DNOC-sodium, doramectin, ecdysterone, emamectin, emamectin benzoate, EMPC, empenthrin, endosulfan, endothion, endrin, EPN, epofenonane, eprinomectin, esdepalléthrine, esfenvalerate, etaphos, ethiofencarb, ethion, ethiprole, ethoate-methyl, ethoprophos, ethyl formate, ethyl-DDD, ethylene dibromide, ethylene dichloride, ethylene oxide, etofenprox, etrimfos, EXD, famphur, fenamiphos, fenazaflor, fenchlorphos, fenethacarb, fenfluthrin, fenitrothion, fenobucarb, fenoxacrim, fenoxycarb, fenpirithrin, fenpropathrin, fensulfothion, fenthion, fenthion-ethyl, fenvalerate, fipronil, flonicamid, flubendiamide, flucofuron, flucycloxuron, flucythrinate, flufenerim, flufenoxuron, flufenprox, fluvalinate, fonofos, formetanate, formetanate hydrochloride, formothion, formparanate, formparanate hydrochloride, fosmethilan, fospirate, fosthietan, fufenozide, furathiocarb, furethrin, gamma-cyhalothrin, gamma-HCH, halfenprox, halofenozide, HCH, HEOD, heptachlor, heptenophos, heterophos, hexaflumuron, HHDN, hydramethylnon, hydrogen cyanide, hyprene, hyquincarb, imidacloprid, imiprothrin, indoxacarb, iodomethane, IPSP, isazofos, isobenzan, isocarbophos, isodrin, isofenphos, isofenphosmethyl, isoprocarb, isoprothiolane, isothioate, isoxathion, ivermectin, jasmolin I, jasmolin II, jodfenphos, juvenile hormone I, juvenile hormone II, juvenile hormone III, kelevan, kinoprene, lambda-cyhalothrin, lead arsenate, lepimectin, leptophos, lindane, lirimfos, lufenuron, lythidathion, malathion, malonoben, mazidox, mecarbam, mecarphon, menazon, meperfluthrin, mephosfolan, mercurous chloride, mesulfenfos, metaflumizone, methacrifos, methamidophos, methidathion, methiocarb, methocrotophos, methomyl, methoprene, methothrin, methoxychlor, methoxyfenozide, methyl bromide, methyl isothiocyanate, methylchloroform, methylene chloride, metofluthrin, metolcarb, metoxadiazone, mevinphos, mexacarbate, milbemectin, milbemycin oxime, mipafox, mirex, molosultap, monocrotophos, monomehypo, monosultap, morphothion, moxidectin, naftalofos, naled, naphthalene, nicotine, nifluridide, nitenpyram, nithiazine, nitrilacarb, novaluron, novifumuron, omethoate, oxamyl, oxydemeton-methyl, oxydeprofos, oxydi sulfoton, para-dichlorobenzene, parathion, parathion-methyl, penfluoron, pentachlorophenol, permethrin, phenkapton, phenothrin, phenthoate, phorate, phosalone, phosfolan, phosmet, phosnichlor, phosphamidon, phosphine, phoxim, phoxim-methyl, pirimetaphos, pirimicarb, pirimiphos-ethyl, pirimiphos-methyl, potassium arsenite, potassium thiocyanate, pp'-DDT, prallethrin, precocene I, precocene II, precocene III, primidophos, profenofos, profluralin, profluthrin, promacyl, promecarb, propaphos, propetamphos, propoxur, prothidathion, prothiofos, prothoate, protrifenbute, pymetrozine, pyraclofos, pyrafluprole, pyrazophos, pyresmethrin, pyrethrin I, pyrethrin II, pyrethrins, pyridaben, pyridalyl, pyridaphenthion, pyrifluquinazon, pyrimidifen, pyrimitate, pyriprole, pyriproxyfen, quassia, quinalphos, quinalphos-methyl, quinothion, rafoxanide, resmethrin, rotenone, ryania, sabadilla, schradan, selamectin, silafluofen, silica gel, sodium arsenite, sodium fluoride, sodium hexafluorosilicate, sodium thiocyanate, sophamide, spinetoram, spinosad, spiromesifen, spirotetramat, sulcofuron, sulcofuron-sodium, sulfluramid, sulfotep, sulfoxaflor, sulfuryl fluoride, sulprofos, tau-fluvalinate, tazimcarb, TDE, tebufenozide, tebufenpyrad, tebupirimfos, teflubenzuron, tefluthrin, temephos, TEPP, terallethrin, terbufos, tetrachloroethane, tetrachlorvinphos, tetramethrin, tetramethylfluthrin, theta-cypermethrin, thiacloprid, thiamethoxam, thicrofos, thiocarboxime, thiocyclam, thiocyclam oxalate, thiodicarb, thiofanox, thiometon, thiosultap, thiosultap-disodium, thiosultap-monosodium, thuringiensin, tolfenpyrad, tralomethrin, transfluthrin, transpermethrin, triarathene, triazamate, triazophos, trichlorfon, trichlormetaphos-3, trichloronat, trifenofos, triflumuron, trimethacarb, triprene, vamidothion, vaniliprole, XMC, xylylcarb, zeta-cypermethrin, zolaprofos and mixtures thereof.

Herbicides mean active ingredients that kill, control or otherwise adversely modify the growth of plants. Examples of herbicides that can be employed in the present disclosure include, but are not limited to: 4-CPA, 4-CPB, 4-CPP, 2,4-D, 3,4-DA, 2,4-DB, 3,4-DB, 2,4-DEB, 2,4-DEP, 3,4-DP, 2,3,6-TBA, 2,4,5-T, 2,4,5-TB, acetochlor, acifluorfen, aclonifen, acrolein, alachlor, allidochlor, alloxydim, allyl alcohol, alorac, ametridione, ametryn, amibuzin, amicarbazone, amidosulfuron, aminocyclopyrachlor, aminopyralid, amiprofos-methyl, amitrole, ammonium sulfamate, anilofos, anisuron, asulam, atraton, atrazine, azafenidin, azimsulfuron, aziprotryne, barban, BCPC, beflubutamid, benazolin, bencarbazone, benfluralin, benfuresate, bensulfuron, bensulide, bentazone, benzadox, benzfendizone, benzipram, benzobicyclon, benzofenap, benzofluor, benzoylprop, benzthiazuron, bicyclopyrone, bifenox, bilanafos, bispyribac, borax, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cacodylic acid, cafenstrole, calcium chlorate, calcium cyanamide, cambendichlor, carbasulam, carbetamide, carboxazole chlorprocarb, carfentrazone, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlornitrofen, chloropon, chlorotoluron, chloroxuron, chloroxynil, chlorpropham, chlorsulfuron, chlorthal, chlorthiamid, cinidon-ethyl, cinmethylin, cinosulfuron, cisanilide, clethodim, cliodinate, clodinafop, clofop, clomazone, clomeprop, cloprop, cloproxydim, clopyralid, cloransulam, CMA, copper sulfate, CPMF, CPPC, credazine, cresol, cumyluron, cyanatryn, cyanazine, cycloate, cyclosulfamuron, cycloxydim, cycluron, cyhalofop, cyperquat, cyprazine, cyprazole, cypromid, daimuron, dalapon, dazomet, delachlor, desmedipham, desmetryn, diallate, dicamba, dichlobenil, dichloralurea, dichlormate, dichlorprop, dichlorprop-P, diclofop, diclo sulam, diethamquat, diethatyl, difenopenten, difenoxuron, difenzoquat, diflufenican, diflufenzopyr, dimefuron, dimepiperate, dimethachlor, dimethametryn, dimethenamid, dimethenamid-P, dimexano, dimidazon, dinitramine, dinofenate, dinoprop, dinosam, dinoseb, dinoterb, diphenamid, dipropetryn, diquat, disul, dithiopyr, diuron, DMPA, DNOC, DSMA, EBEP, eglinazine, endothal, epronaz, EPTC, erbon, esprocarb, ethalfluralin, ethametsulfuron, ethidimuron, ethiolate, ethofumesate, ethoxyfen, ethoxysulfuron, etinofen, etnipromid, etobenzanid, EXD, fenasulam, fenoprop, fenoxaprop, fenoxaprop-P, fenoxasulfone, fenteracol, fenthiaprop, fentrazamide, fenuron, ferrous sulfate, flamprop, flamprop-M, flazasulfuron, florasulam, fluazifop, fluazifop-P, fluazolate, flucarbazone, flucetosulfuron, fluchloralin, flufenacet, flufenican, flufenpyr, flumetsulam, flumezin, flumiclorac, flumioxazin, flumipropyn, fluometuron, fluorodifen, fluoroglycofen, fluoromidine, fluoronitrofen, fluothiuron, flupoxam, flupropacil, flupropanate, flupyrsulfuron, fluridone, fluorochloridone, fluoroxypyr, flurtamone, fluthiacet, fomesafen, foramsulfuron, fosamine, furyloxyfen, glufosinate, glufosinate-P, glyphosate, halosafen, halosulfuron, haloxydine, haloxyfop, haloxyfop-P, hexachloroacetone, hexaflurate, hexazinone, imazamethabenz, imazamox, imazapic, imazapyr, imazaquin, imazethapyr, imazosulfuron, indanofan, indaziflam, iodobonil, iodomethane, iodosulfuron, ioxynil, ipazine, ipfencarbazone, iprymidam, isocarbamid, isocil, isomethiozin, sonoruron, isopolinate, isopropalin, isoproturon, isouron, isoxaben, isoxachlortole, isoxaflutole, isoxapyrifop, karbutilate, ketospiradox, lactofen, lenacil, linuron, MAA, MAMA, MCPA, MCPA-thioethyl, MCPB, mecoprop, mecoprop-P, medinoterb, mefenacet, mefluidide, mesoprazine, mesosulfuron, mesotrione, metam, metamifop, metamitron, metazachlor, metazosulfuron, metflurazon, methabenzthiazuron, methalpropalin, methazole, methiobencarb, methiozolin, methiuron, methometon, methoprotryne, methyl bromide, methyl isothiocyanate, methyldymron, metobenzuron, metobromuron, metolachlor, metosulam, metoxuron, metribuzin, metsulfuron, molinate, monalide, monisouron, monochloroacetic acid, monolinuron, monuron, morfamquat, MSMA, naproanilide, napropamide, naptalam, neburon, nicosulfuron, nipyraclofen, nitralin, nitrofen, nitrofluorfen, norflurazon, noruron, OCH, orbencarb, orthodichlorobenzene, orthosulfamuron, oryzalin, oxadiargyl, oxadiazon, oxapyrazon, oxasulfuron, oxaziclomefone, oxyfluorfen, parafluoron, paraquat, pebulate, pelargonic acid, pendimethalin, penoxsulam, pentachlorophenol, pentanochlor, pentoxazone, perfluidone, pethoxamid, phenisopham, phenmedipham, phenmedipham-ethyl, phenobenzuron, phenylmercury acetate, picloram, picolinafen, pinoxaden, piperophos, potassium arsenite, potassium azide, potassium cyanate, pretilachlor, primisulfuron, procyazine, prodiamine, profluazol, profluralin, profoxydim, proglinazine, prometon, prometryn, propachlor, propanil, propaquizafop, propazine, propham, propisochlor, propoxycarbazone, propyrisulfuron, propyzamide, prosulfalin, prosulfocarb, prosulfuron, proxan, prynachlor, pydanon, pyraclonil, pyraflufen, pyrasulfotole, pyrazolynate, pyrazosulfuron, pyrazoxyfen, pyribenzoxim, pyributicarb, pyriclor, pyridafol, pyridate, pyriftalid, pyriminobac, pyrimisulfan, pyrithiobac, pyroxasulfone, pyroxsulam, quinclorac, quinmerac, quinoclamine, quinonamid, quizalofop, quizalofop-P, rhodethanil, rimsulfuron, saflufenacil, S-metolachlor, sebuthylazine, secbumeton, sethoxydim, siduron, simazine, simeton, simetryn, SMA, sodium arsenite, sodium azide, sodium chlorate, sulcotrione, sulfallate, sulfentrazone, sulfometuron, sulfosulfuron, sulfuric acid, sulglycapin, swep, TCA, tebutam, tebuthiuron, tefuryltrione, tembotrione, tepraloxydim, terbacil, terbucarb, terbuchlor, terbumeton, terbuthylazine, terbutryn, tetrafluoron, thenylchlor, thiazafluoron, thiazopyr, thidiazimin, thidiazuron, thiencarbazone-methyl, thifensulfuron, thiobencarb, tiocarbazil, tioclorim, topramezone, tralkoxydim, tri-allate, triasulfuron, triaziflam, tribenuron, tricamba, triclopyr, tridiphane, trietazine, trifloxysulfuron, trifluralin, triflusulfuron, trifop, trifopsime, trihydroxytriazine, trimeturon, tripropindan, tritac tritosulfuron, vernolate, xylachlor and mixtures thereof.

Safeners mean active ingredients applied with herbicides to protect crops against their injury. Some of the safeners that can be employed in the present disclosure include, but are not limited to: benoxacor, benthiocarb, brassinolide, cloquintocet (mexyl), cyometrinil, daimuron, dichlormid, dicyclonon, dimepiperate, di sulfoton, fenchlorazole-ethyl, fenclorim, flurazole, fluxofenim, furilazole, isoxadifen-ethyl, mefenpyr-diethyl, MG 191, MON 4660, naphthalic anhydride (NA), oxabetrinil, 829148, N-phenylsulfonylbenzoic acid amides and mixtures thereof.

Nematicides mean active ingredients having an effect on, such as reduction in the damage caused by, agricultural-related nematodes. Examples of nematicides which may be used in the present disclosure include, but are not limited to: an avermectin (e.g., abamectin), carbamate nematicides (e.g., aldicarb, thiadicarb, carbofuran, carbosulfan, oxamyl, aldoxycarb, ethoprop, methomyl, benomyl, alanycarb), organophosphorus nematicides (e.g., phenamiphos (fenamiphos), fensulfothion, terbufos, fosthiazate, dimethoate, phosphocarb, dichlofenthion, isamidofos, fosthietan, isazofos ethoprophos, cadusafos, terbufos, chlorpyrifos, dichlofenthion, heterophos, isamidofos, mecarphon, phorate, thionazin, triazophos, diamidafos, fosthietan, phosphamidon, captan and mixtures thereof.

Plant growth regulators mean active ingredients used to influence the growth characteristics of plants. Examples of plant growth regulators which may be used in the present disclosure include, but are not limited to: 1-naphthaleneacetic acid, 1-naphthaleneacetic acid K-salt, 1-napthol, 2,4-dichlorophenoxyacetic acid (2,4-D), 2,4-DB, 2,4-DEP, 2,3,5-triiodobenzoic acid, 2,4,5-trichlorophenoxyacetic acid, 2-naphthoxyacetic acid, 2-naphthoxyacetic acid sodium salt, 3-chloro-4-hydroxyphenylacetic acid, 3-indoleacetic acid, 4-biphenylacetic acid, 4-chlorophenoxyacetic acid (4-CPA), 4-hydroxyphenylacetic acid, 6-benzylaminopurine, Auxindole, α-naphthaleneacetic acid K-salt, β-naphthoxyacetic acid, p-chlorophenoxyacetic acid, dicamba, dichlorprop, fenoprop, indole-3-acetic acid (IAA), indole-3-acetyl-DL-aspartic acid, indole-3-acetyl-DL-tryptophan, indole-3-acetyl-L-alanine, indole-3-acetyl-L-valine, indole-3-butyric acid (IBA), indole-3-butyric acid K-salt, indole-3-propionic acid; α-naphthaleneacetic acid, methyl indole-3-acetate, naphthalene acetamide, naphthaleneacetic acid (NAA), phenylacetic acid, picloram, potassium naphthenate, sodium naphthenate, 4-hydroxyphenethyl alcohol, 4-CPPU, 6-benzylaminopurine (BA), 6-(Y,Y-dimethylallylamino)purine (2iP), 2-iP-2HC1, adenine, adenine hemi sulfate, benzyladenine, kinetin, meta-topolin, N6-benzoyl adenine, N-benzyl-9-(2-tetrahydropyranyl) adenine (BP A), N-(2-chloro-4-pyridyl)-N-phenylurea, gibberellic acid ($GA_3$), gibberellins, gibberellins A4+A7 ($GA_{4/7}$), ethylene and abscisic acid.

The term "target substrate" refers to sites underlying plant foliage which are the intended destination for the pesticide including, but not limited to, natural ground surfaces such as soil, water (lakes, ponds, marshes, swamps, streams, puddles, etc.) and artificial surfaces such as pavement; a pest; or a combination thereof.

A "pest" generally includes insects, mites, ticks and other arthropods; disease agents such as fungi, protozoa, bacteria and viruses; helminths, nematodes (roundworms), cestodes (tapeworms), platyhelminths (flatworms), trematodes (flukes) and other worms; sporozoan parasites; slugs and snails; and vertebrates such as birds, rodents or other vertebrates which can directly or indirectly injure or cause disease or damage in any plant or part thereof or any processed, manufactured or other product of the plant.

A "pesticidally effective amount" refers to that amount of a pesticide which, upon application, either reduces the presence of pests, or enhances a plant's resistance to a pest.

According to one aspect, the present disclosure provides a dispersant obtained from the reaction of a styrene maleic anhydride copolymer and a polyether monoamine.

Styrene maleic anhydride copolymers are polymers that are formed with styrene and maleic anhydride monomers. For the various aspects, the styrene maleic anhydride copolymer has a first constitutional unit of the formula

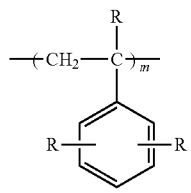

and a second constitutional unit of the formula

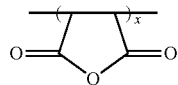

where each m and x is independently a real number that represents a mole fraction of the respective constitutional unit in the styrene maleic anhydride copolymer, and each R is independently a hydrogen, an aromatic group or an aliphatic group. As used herein, "constitutional units" refer to the smallest constitutional unit (a group of atoms comprising a part of the essential structure of a macromolecule), or monomer, the repetition of which constitutes a macromolecule, such as a polymer.

For various aspects, the mole fraction m is within a range of from about 0.50 to about 0.89 and the mole fraction x is within a range of from about 0.11 to about 0.50, where (m+x)=1.00. In aspects of the present disclosure, m and x are each greater than zero. With respect to each R group, examples of the aromatic group include, but are not limited to, phenyl, biphenyl, naphthyl, substituted phenyl or biphenyl, and naphthyl. Examples of the aliphatic group include, but are not limited to, alkyl and alicyclic alkyl.

The styrene maleic anhydride copolymers which may be used in the present disclosure can be selected from one styrene maleic anhydride copolymer or mixtures of styrene maleic anhydride copolymers, and having a styrene to maleic anhydride molar ratio of at least 4.0:1.0, or in other aspects at least 5.0:1.0, while in still other aspects at least 6.0:1.0, and in still further aspects at least 7.0:1.0 (see FIG. 1). In contrast to what is generally taught with respect to state of the art dispersants, Applicant has unexpectedly found that a styrene to maleic anhydride ratio of at least 4.0:1.0 is critical to the ability of the inventive dispersants to permit agrochemical suspension concentrate compositions to be milled, to minimize the viscosity of concentrated particle suspensions at elevated temperatures while under constant shear, and to reduce or prevent Ostwald ripening of slightly water soluble pesticides.

According to other aspects, the styrene maleic anhydride copolymers which may be used in the present disclosure can be selected from one styrene maleic anhydride copolymer or mixtures of styrene maleic anhydride copolymers, and having a styrene to maleic anhydride molar ratio within a range of from 4.0:1.0 to 8.0:1.0, and in other aspects within a range of from 6.0:1.0 to 8.0:1.0.

According to another aspect, styrene maleic anhydride copolymers which may be used in the present disclosure can be selected from one styrene maleic anhydride copolymer or mixtures of styrene maleic anhydride copolymers, and having a weight average molecular weight (Mw) that is less than 50,000 grams per mole (g/mol), in other aspects less than 20,000 g/mol, and in still more aspects less than 15,000 g/mol. The weight average molecular weight can be determined by gel permeation chromatography (GPC).

According to another aspect, other monomers, besides styrene, may be incorporated into the backbone of the styrene maleic anhydride copolymer. In general, monomers suitable for use are those having a low molecular weight to keep the overall molecular weight of the final polymer relatively low (for e.g., less than 15,000 g/mol) so that it remains relatively water soluble. Possible monomers that may be present, in addition to styrene, include olefins such as ethylene, conjugated dienes such as 1,3-butadiene and isoprene, acrylic acid, alkyl acrylates and methacrylates, especially lower alkyl such as methyl, ethyl and, the butyl and ethylhexyl esters, vinyl acetate, acrylonitrile, methacrylonitrile, acrylamides, methacrylamides, unsaturated ethers such as alkyl vinyl ethers, for instance, the methyl and ethyl ethers, AMPS, alpha-methyl styrene and hydroxyethyl methacrylate.

Commercially available styrene maleic anhydrides which may be used include, but are not limited to, SMA® EF-40, SMA® EF-60 and SMA® EF-80 resins (available from Total Cray Valley).

According to another aspect, the styrene maleic anhydride copolymer is reacted with a polyether monoamine where the polyether monoamine is water soluble. Such polyether monoamines are well known in the art. The polyether portion of the polyether monoamine typically contains an alkylene oxide portion, such as derived from ethylene oxide (EO), propylene oxide (PO), butylene oxide, and combinations thereof. Frequently, the polyether monoamines contain combinations of EO and PO. The polyether monoamines can contain 100% of a given alkylene oxide or may contain two or more different alkylene oxides.

In one aspect, the polyether monoamine is a compound represented by the formula

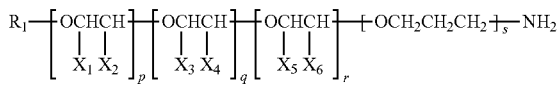

where $R_1$ is selected from the group consisting of hydrogen, and any $C_1$ to about $C_4$ hydrocarbyl group; $X_1$, $X_2$, $X_3$, $X_4$, $X_5$, and $X_6$ in each occurrence are independently selected from the group consisting of: hydrogen, methyl and ethyl, subject to the proviso that at least one of the two X groups that are attached to the same alkoxy unit are hydrogen; p, q, and r may each independently be any integer between zero and about 100, including zero, subject to the proviso that at least one of p, q, and r is not zero; and, s is either 0 or 1 and the polyether monoamine is water soluble.

Thus, the above structure includes, without limitation, both random and block polymers and co-polymers of any one or more of the following, either alone or mixed with one another in any proportion: ethylene oxide, propylene oxide, and butylene oxide. According to one aspect, the molecular weight of the polyether monoamine reactant is any molecular weight between about 500 and 3000. In another particular embodiment, the polyether monoamine has a molecular weight between about 600 to about 3000.

In cases where mixtures of such amines are employed to produce a reaction product herein, the preferred molecular weight will in reality be an average molecular weight of all amines present, as it is recognized by those skilled in the art that the production of such alkoxylated amines inherently results in the production of a mixture of amines, by the nature of the process.

Examples of polyether monoamines suitable for use in this disclosure includes without limitation, those marketed by Huntsman Petrochemical LLC of The Woodlands, Texas under the trademarks JEFFAMINE® and SURFONAMINE®, as well as analogous compounds offered by other companies comprising polyoxyalkylenated primary amines. Examples include JEFFAMINE® M-1000 and JEFFAMINE® M-2070 which have the following structures:

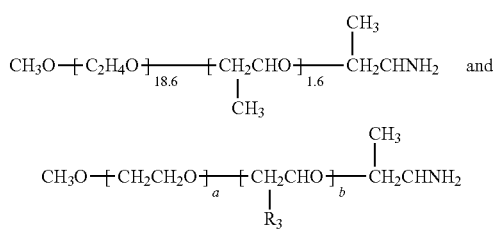

where $R_3$=H or $CH_3$, a is from about 3 to about 32 and b is from about 10 to about 32. While these compounds are methoxy terminated, the polyether monoamine can also be capped with other groups where the methyl group of the methoxy group is replaced with a higher hydrocarbon such as ethyl, propyl, butyl, phenyl, or benzyl. The amine termination is typically a primary amine group. Additional representative non-limiting examples of suitable amine-terminated polyethers for use in the practice of this disclosure include SURFONAMINE®E L-100 amine, a 1000 molecular weight methyl capped amine having a PO/EO ratio of 3/19; SURFONAMINE® L-207 amine, a 2000 molecular weight methyl capped amine having a PO/EO ratio of 10/31; SURFONAMINE® L-300 amine, a 3000 molecular weight methyl capped amine having a PO/EO ratio of 8/58; and JEFFAMINE®, M-2095, a 2000 molecular weight methyl-capped amine with a PO/EO ratio of about 4/41.

The polyether monoamine can be prepared using well known amination techniques such as those described in U.S. Pat. Nos. 3,654,370; 4,152,353; 4,618,717; 4,766,245; 4,960,942; 4,973,761; 5,003,107; 5,352,835; 5,422,042; and 5,457,147, the contents of which are herein incorporated by reference. Generally, the polyether monoamine is made by aminating a polyether monol with ammonia in the presence of a catalyst such as a nickel containing catalyst, for example, a Ni/Cu/Cr catalyst.

In one particular aspect, the polyether monoamine is a polyoxyethylene polyoxypropylene monoamine having a molar ratio of EO to PO greater than or equal to 3 and/or has a molecular weight between about 600 to about 3000.

The reaction between the styrene maleic anhydride copolymer and polyether monoamine may be conducted in the presence of a solvent. Solvents which may be used are nonreactive toward the copolymer resin and the polyether monoamine. In some aspects, the solvent is aprotic. For example, the solvent can be an aromatic solvent such as benzene and an alkylbenzene such as toluene and xylene, an ether such as methyl t-butyl ether, a ketone such as methylisobutylketone, an ester such as ethyl acetate, propyl acetate, a carbonate such as ethylene carbonate, propylene carbonate, and butylene carbonate, a halogenated aliphatic hydrocarbon such as dichloromethane, lactones such as butyrolactone, and an aliphatic nitrite such as butyronitrile. Mixtures of solvents may also be used. There may also be used co-solvents to change the properties of solvents or solvent mixtures. The solvent may be used in quantities sufficient to dissolve the copolymer resin and, optionally, the reaction product of this disclosure. The amount of solvent used can vary widely and will be any amount suitable for making the reaction product, as is apparent to one of skill in the art.

The dispersant obtained from the reaction of the styrene maleic anhydride copolymer and the polyether monoamine can be referred to as an amic acid (or "half amide"). Because the reaction product may form a polymer having more than one amic acid group, the reaction product may be a polyamic acid. In addition to the half amide, the amic acid also has a carboxylic acid functional group. This reaction product can be achieved at relatively mild reaction temperatures as a result of the high reactivity of the anhydride linkage. Temperatures of less than 100° C., and in some embodiments less than about 60° C. are sufficient to convert the anhydride to the amic acid when the polyether monoamine is present. At higher reaction temperatures, it is possible to form an imide by condensation and elimination of water. While imide formation is not harmful to the performance of the resulting product, it is not the object of this disclosure to form imides.

In one aspect of the present disclosure, the carboxylic acid group(s) that are part of the amic acid or polyamic acid reaction product are either partially or wholly neutralized. These carboxylic acid groups may be neutralized by sodium, potassium, calcium, ammonia, other alkylamines or other neutralization chemicals known by those skilled in the art. By leaving the carboxylic acid groups alone or by partially or wholly neutralizing the carboxylic acid groups, one skilled in the art may be able to fine tune an agricultural composition for a particular application.

The dispersant may be made by dissolving the styrene maleic anhydride copolymer in a non-reactive solvent such as propylene carbonate, and reacting the mixture with the desired polyether monoamine to make the amic acid. The resin and solvent may be heated to about 60° C. prior to the addition of the polyether monoamine to thereby facilitate a more rapid reaction. The order of addition is not believed to be critical and as such the anhydride resin can be added to the monoamine. Typically, stoichiometric amounts of monoamine are added relative to the amount of anhydride in the resin. However, it is believed that more or less than stoichiometric amounts of monoamine can also form an excellent dispersant. The non-reactive solvent will act as a processing aid to simplify the synthesis of the dispersant product. In some aspects, the solvent may be left in the dispersant product while in other aspects the solvent may be removed from the dispersant product. As much or as little solvent can be used/removed as desired. Finally, the reaction product can be isolated and purified, as desired, using techniques well known to those of skill in the art.

In some aspects, the dispersant of the present disclosure will have a maximum viscosity of 800 mPa s at 25° C. In other aspects, the dispersant of the present disclosure may have a total solids content (%) of less than about 60, or less than about 55, or even less than about 50. In still other aspects, the dispersant of the present disclosure may have a total solids content (%) of more than about 35, or more than about 40, or even more than about 45.

The dispersants of the present disclosure offer advantages over state of the art dispersants prepared from styrene maleic anhydride copolymers which have a styrene to maleic anhydride molar ratio outside of the inventive molar ratio since agricultural compositions containing the inventive dispersants will exhibit a lower viscosity and improved performance at elevated temperature. The claimed dispersants can also reduce or prevent Ostwald ripening and allow for the high-shear milling of agrochemical suspension concentrate compositions as well as improving their suspensibility when diluted in water prior to application to a substrate.

According to another aspect, there is provided an aqueous agricultural composition comprising the dispersant of the present disclosure and a pesticide.

In some embodiments, the pesticide is sparingly water-soluble. It is, in these embodiments, soluble in water at 20° C. to at most 10 g/L, preferably to at most 3 g/l, and in particular to at most 0.5 g/l. The pesticide is usually solid at 20° C. In some embodiments, the pesticide has a melting point of at least 50° C., or at least 80° C. and in particular at least 120° C.

According to one embodiment, the aqueous agricultural composition contains at least about 0.1% by weight of the dispersant, or at least about 0.5% by weight of the dispersant, or at least about 1% by weight of the dispersant, or at least about 3% by weight of the dispersant, or even at least about 5% by weight of the dispersant, based on the total weight of the aqueous agricultural composition.

In another embodiment, the aqueous agricultural composition contains less than about 7% by weight of the dispersant, or less than about 6% by weight of the dispersant, or less than about 5% by weight of the dispersant, or less than about 4% by weight of the dispersant, or even less than about 3% by weight of the dispersant, based on the total weight of the aqueous agricultural composition.

In yet another embodiment, the aqueous agricultural composition contains from about 0.05%-7% by weight of the dispersant, or from about 0.5%-6% by weight of the dispersant, or from about 1%-5.5% by weight of the dispersant, or even from about 3%-5% by weight of the dispersant, based on the total weight of the aqueous agricultural composition.

The aqueous agricultural composition may also comprise at least about 0.5% by weight of the pesticide. In some embodiments, it comprises at least about 2% by weight, or even at least about 5% by weight, of the pesticide, based on the total weight of the aqueous agricultural composition.

In other embodiments, the aqueous agricultural composition may comprise up to about 70% by weight, or up to about 65% by weight, or up to about 60% by weight, or up to about 50% by weight, or even up to about 40% by weight of the pesticide, based on the total weight of the aqueous agricultural composition. In case the aqueous agricultural composition contains a further pesticide, then the aforementioned amounts apply to the total amount of pesticide and further pesticide.

At least one pesticide is present in suspended form in the aqueous agricultural composition. A further pesticide may be present in suspended, emulsified or dissolved form, wherein the emulsified form is preferred. The further pesticide may be selected from the group of fungicides, insecticides, nematicides, herbicides, safeners, plant growth regulators and mixtures thereof. Thus, in another aspect, there is provided an agrochemical suspension concentrate composition comprising: a) a continuous aqueous phase; b) a partially water-soluble pesticide; and c) the dispersant of the present disclosure.

The aqueous agricultural composition can further comprise at least about 10% by weight of water, or at least about 30% by weight, and in particular at least about 45% by weight, of water, based on the total weight of the aqueous agricultural composition. In another embodiment, the aqueous agricultural composition may comprise up to about 90%, or even up to about 75% by weight of water, based on the total weight of the aqueous agricultural composition.

The aqueous agricultural composition may also comprise agrochemical formulation auxiliaries. Suitable formulation auxiliaries are dispersants other than those of the present disclosure, solvents, liquid carriers, solid carriers or fillers, surfactants, emulsifiers, wetting agents, solubility promoters, penetration promoters, protective colloids, stickers, thickeners, humectants, repellants, attractants, feed stimulants, compatibilizing agents, bactericides, antifreezes, foam inhibitors, colorants, adhesives and binders.

The aqueous agrochemical compositions may be useful for the control of phytopathogenic fungi and/or undesired plant growth and/or undesired insect or mite attack and/or for regulating the growth of plants, where the composition is allowed to act on the particular pests, their habitat or the plants to be protected from the respective pest, the soil and/or on undesired plants and/or the useful plants and/or their habitat. Furthermore, use of the aqueous agrochemical compositions may control undesired insect or mite attack on plants and/or control phytopathogenic fungi and/or control undesired plant growth, in which case seed materials of useful plants are treated with the composition. Finally, the aqueous agrochemical compositions and suspension concentrate compositions may exhibit reduced Ostwald ripening. Thus, in another particular aspect, there is provided a suspension concentrate composition comprising: a) a continuous aqueous phase; b) a partially water-soluble pesticide; and c) the dispersant of the present disclosure, the dispersing agent being present in an amount sufficient to reduce or prevent Ostwald ripening of the pesticide (b) in the composition, such as in an amount of at least about 1% by weight of the dispersant, or at least about 3% by weight of the dispersant, or even at least about 5% by weight of the dispersant, based on the total weight of the suspension concentrate composition.

According to another aspect, the aqueous agrochemical compositions of the present disclosure may be used in conventional agricultural methods. For example, the aqueous agricultural composition may be applied post-emergence to a desired target substrate by any means, such as airplane spray tanks, knapsack spray tanks, cattle dipping vats, farm equipment used in ground spraying (for e.g., boom sprayers, hand sprayers), and the like.

In accordance with another embodiment, the presently described technology provides a method for killing or inhibiting or repelling a pest comprising the steps of providing a pesticide in a pesticidally effective amount, providing an effective amount of the dispersant of the present disclosure, combining the pesticide and optionally a fertilizer with the dispersant and water to prepare an aqueous agrochemical formulation, and contacting the aqueous agrochemical formulation and the pest.

In another aspect, there is provided a method for reducing or preventing Ostwald Ripening of an aqueous agricultural composition comprising adding the dispersant above to the aqueous agricultural composition. In one particular aspect, the aqueous agricultural composition comprises a pesticidally effective amount of a pesticide.

The dispersant may also be used in other applications including as a pigment dispersant for paint, dye or ink formulations and as a superplasticizer for cement or wallboard. Thus, other aspects of the present disclosure include a paint composition comprising the dispersant, a dye or ink formulation comprising the dispersant, and a cement or wallboard comprising the dispersant.

EXAMPLES

Example 1: Dispersant Synthesis Procedure

The following procedure was used to prepare the dispersants used in the examples below.

In a suitable reaction vessel equipped with electrical heating, overhead stirring, and an inert atmosphere, were combined a styrene maleic anhydride resin, dry tetrohydrofuran (THF) and JEFFAMINE® monoamine, according to the amounts shown below in Table 1. The mixture was stirred and heated to 115° C. for 4 hours, during which the resin dissolved and reacted with the monoamine. After the reaction was complete, a glycol ether solvent was added and the THF was selectively removed under vacuum at 70° C., leaving a clear solution of dispersant in glycol ether. The dispersant concentration, based on solids, was 50%.

TABLE 1

| | Part 1 SMA resin | Grams Resin | Part 2 Monoamine | Grams Monoamine | Grams THF | Grams DPM | Soluble In water |
|---|---|---|---|---|---|---|---|
| Dispersant 1 | SMA-1000 | 100 | JEFFAMINE M-2070 | 820 | 900 | 920 | YES |
| Dispersant 2 | SMA-1000 | 100 | JEFFAMINE M-1000 | 410 | 500 | 510 | YES |
| Dispersant 3 | SMA-1000 | 100 | JEFFAMINE M-2095 | 820 | 900 | 920 | YES |
| Dispersant 4 | SMA-1000 | 100 | JEFFAMINE M-3085 | 1230 | 1300 | 1330 | YES |
| Dispersant 5 | SMA-2000 | 100 | JEFFAMINE M-2070 | 633 | 700 | 733 | YES |
| Dispersant 6 | SMA-2000 | 100 | JEFFAMINE M-1000 | 316 | 400 | 416 | YES |
| Dispersant 7 | SMA-2000 | 100 | JEFFAMINE M-2095 | 633 | 700 | 733 | YES |
| Dispersant 8 | SMA-2000 | 100 | JEFFAMINE M-3085 | 949 | 1000 | 1049 | YES |
| Dispersant 9 | SMA-3000 | 100 | JEFFAMINE M-2070 | 508 | 600 | 608 | YES |
| Dispersant 10 | SMA-3000 | 100 | JEFFAMINE M-1000 | 254 | 300 | 354 | YES |
| Dispersant 11 | SMA-3000 | 100 | JEFFAMINE M-2095 | 508 | 600 | 608 | YES |
| Dispersant 12 | SMA-3000 | 100 | JEFFAMINE M-3085 | 762 | 800 | 862 | YES |
| Dispersant 13 | SMA EF-40 | 100 | JEFFAMINE M-2070 | 383 | 500 | 483 | YES |
| Dispersant 14 | SMA EF-40 | 100 | JEFFAMINE M-1000 | 192 | 300 | 292 | YES |
| Dispersant 15 | SMA EF-40 | 100 | JEFFAMINE M-2095 | 383 | 500 | 483 | YES |
| Dispersant 16 | SMA EF-40 | 100 | JEFFAMINE M-3085 | 575 | 700 | 675 | YES |
| Dispersant 17 | SMA EF-60 | 100 | JEFFAMINE M-2070 | 278 | 400 | 378 | YES |
| Dispersant 18 | SMA EF-60 | 100 | JEFFAMINE M-1000 | 139 | 200 | 239 | YES |
| Dispersant 19 | SMA EF-60 | 100 | JEFFAMINE M-2095 | 278 | 400 | 378 | YES |
| Dispersant 20 | SMA EF-60 | 100 | JEFFAMINE M-3085 | 417 | 500 | 517 | YES |
| Dispersant 21 | SMA EF-80 | 100 | JEFFAMINE M-2070 | 214 | 300 | 314 | YES |
| Dispersant 22 | SMA EF-80 | 100 | JEFFAMINE M-1000 | 107 | 200 | 207 | YES |
| Dispersant 23 | SMA EF-80 | 100 | JEFFAMINE M-2095 | 214 | 300 | 314 | YES |
| Dispersant 24 | SMA EF-80 | 100 | JEFFAMINE M-3085 | 321 | 400 | 421 | YES |
| Dispersant 25 | SMA-1000 | 100 | JEFFAMINE M-600 | 246 | 300 | 346 | NO |
| Dispersant 26 | SMA-1000 | 100 | JEFFAMINE M-2005 | 820 | 900 | 920 | NO |

TABLE 1-continued

| Part 1 SMA resin | | Grams Resin | Part 2 Monoamine | Grams Monoamine | Grams THF | Grams DPM | Soluble In water |
|---|---|---|---|---|---|---|---|
| Dispersant 27 | SMA-2000 | 100 | JEFFAMINE M-600 | 190 | 300 | 290 | NO |
| Dispersant 28 | SMA-2000 | 100 | JEFFAMINE M-2005 | 633 | 700 | 733 | NO |
| Dispersant 29 | SMA-3000 | 100 | JEFFAMINE M-600 | 152 | 250 | 252 | NO |
| Dispersant 30 | SMA-3000 | 100 | JEFFAMINE M-2005 | 508 | 600 | 608 | NO |
| Dispersant 31 | SMA EF-40 | 100 | JEFFAMINE M-600 | 115 | 200 | 215 | NO |
| Dispersant 32 | SMA EF-40 | 100 | JEFFAMINE M-2005 | 383 | 500 | 483 | NO |
| Dispersant 33 | SMA EF-60 | 100 | JEFFAMINE M-600 | 83 | 200 | 183 | NO |
| Dispersant 34 | SMA EF-60 | 100 | JEFFAMINE M-2005 | 278 | 400 | 378 | NO |
| Dispersant 35 | SMA EF-60 | 100 | JEFFAMINE M-600 | 64 | 200 | 164 | NO |
| Dispersant 36 | SMA EF-60 | 100 | JEFFAMINE M-2005 | 214 | 300 | 314 | NO |

Styrene maleic anhydride resins were obtained from Total Cray Valley USA:
SMA-1000 has a styrene:maleic ratio of 1:1
SMA-2000 has a styrene:maleic ratio of 2:1
SMA-3000 has a styrene:maleic ratio of 3:1
SMA EF-40 has a styrene:maleic ratio of 4:1
SMA EF-60 has a styrene:maleic ratio of 6:1
SMA EF-80 has a styrene:maleic ratio of 8:1
JEFFAMINE® monoamines were obtained from Huntsman Petrochemical LLC:
JEFFAMINE® M-2070 amine has a molecular weight of about 2000 and has a ratio of EO:PO of about 3:1
JEFFAMINE® M-1000 amine has a molecular weight of about 1000 and has a ratio of EO:PO of about 7.2:1
JEFFAMINE® M-2095 amine has a molecular weight of about 2000 and has a ratio of EO:PO of about 11:1
JEFFAMINE® M-3085 amine has a molecular weight of about 3000 and has a ratio of EO:PO of about 7:1
JEFFAMINE® M-600 amine has a molecular weight of about 600 and has a ratio of EO:PO of about 1:9
JEFFAMINE® M-2005 amine has a molecular weight of about 2000 and has a ratio of EO:PO of about 1:5
THF and glycol ether solvent were tetrahydrofuran and dipropylene glycol methyl ether, respectively.

Dispersants 25-36, in which the reactant monoamine EO:PO ratio was less than 3:1, were found to be insoluble in water, and as a result, completely ineffective as a dispersant for water-based pesticide formulations. No further comparisons were made with this group.

Dispersants 1-24 were then used in typical agrochemical compositions. Two pesticide active ingredients, metribuzin and propanil were selected to run side by side comparisons of the 24 water soluble dispersants described in Table 1. This tested the ability of the dispersant to effectively disperse tiny particles of pesticide active ingredient during the particle size reduction process. The comparisons showed that only certain combinations of SMA resin and polyether monoamine formed effective dispersants for use in suspension concentrate type compositions.

Metribuzin Milling Trial
Metribuzin technical (150 grams), dispersant solution from Table 1 (7.5 grams), wetting agent (Surfonic® L24-7 agent, available from Huntsman Petrochemical LLC, 4.8 grams), propylene glycol (19.2 grams), and water (118.2 grams) were combined in a beaker and mixed with a spatula. The slurry was then transferred to a bead mill (Eiger Mini-100, available from EMI, Grayslake, IL) and milling at 2500 rpm was attempted using 1 mm glass media for 10 minutes. Depending on which dispersant from Table 1 was selected, milling was either successful or unsuccessful. Successful milling resulted in a smooth, flowable light-colored suspension with a median particle size of around 4 microns. Milling was deemed unsuccessful when, during the milling process, the mixture turned into a paste that would not flow or mill further. When milling was unsuccessful, the median particle size was generally greater than 100 microns. A paste is unacceptable because it cannot be readily transferred by pumping, and will not pour from a standard plastic jug package. Table 2 gives the results of the metribuzin milling trial.

TABLE 2

| Dispersant (see table 1) | Metribuzin Suspension Appearance | Success |
|---|---|---|
| 1 | Paste | NO |
| 2 | Paste | NO |
| 3 | Paste | NO |
| 4 | Paste | NO |
| 5 | Paste | NO |
| 6 | Paste | NO |
| 7 | Paste | NO |
| 8 | Paste | NO |
| 9 | Paste | NO |
| 10 | Paste | NO |
| 11 | Paste | NO |
| 12 | Paste | NO |
| 13 | Flowable liquid | YES |
| 14 | Flowable liquid | YES |
| 15 | Flowable liquid | YES |
| 16 | Flowable liquid | YES |
| 17 | Flowable liquid | YES |
| 18 | Flowable liquid | YES |
| 19 | Flowable liquid | YES |
| 20 | Flowable liquid | YES |
| 21 | Flowable liquid | YES |
| 22 | Flowable liquid | YES |
| 23 | Flowable liquid | YES |
| 24 | Flowable liquid | YES |

Propanil Milling Trial

Propanil technical (150 grams), dispersant solution from Table 1 (7.5 grams), wetting agent (Surfonic L24-7 ® agent, 4.8 grams), propylene glycol (19.2 grams), and water (118.2 grams) were combined in a beaker and mixed with a spatula. The slurry was then transferred to a bead mill (Eiger Mini-100, available from EMI, Grayslake, IL) and milling at 2500 rpm was attempted using 1 mm glass media for 10 minutes. Depending on which dispersant from Table 1 was selected, milling was either successful or unsuccessful. Successful milling resulted in a smooth, flowable light-colored suspension with a median particle size of around 4 microns. Milling was deemed unsuccessful when, during the milling process, the mixture turned into a paste that would not flow or mill further. When milling was unsuccessful, the median particle size was unacceptably large, generally greater than 100 microns. A paste is unacceptable because it cannot be readily transferred by pumping, and will not pour from a standard plastic jug package. Table 3 gives the results of the propanil milling trial.

TABLE 3

| Dispersant (see table 1) | Propanil Suspension Appearance | Success |
|---|---|---|
| 1 | Paste | NO |
| 2 | Paste | NO |
| 3 | Paste | NO |
| 4 | Paste | NO |
| 5 | Paste | NO |
| 6 | Paste | NO |
| 7 | Paste | NO |
| 8 | Paste | NO |
| 9 | Paste | NO |
| 10 | Paste | NO |
| 11 | Paste | NO |
| 12 | Paste | NO |
| 13 | Flowable liquid | YES |
| 14 | Flowable liquid | YES |
| 15 | Flowable liquid | YES |
| 16 | Flowable liquid | YES |
| 17 | Flowable liquid | YES |
| 18 | Flowable liquid | YES |
| 19 | Flowable liquid | YES |
| 20 | Flowable liquid | YES |
| 21 | Flowable liquid | YES |
| 22 | Flowable liquid | YES |
| 23 | Flowable liquid | YES |
| 24 | Flowable liquid | YES |

The above milling trials with both metribuzin and propanil demonstrate that for successful milling and particle size reduction to occur, the dispersant must comprise an SMA with a styrene to maleic anhydride molar ratio of 4:1 or greater.

Example 2: Comparison of Dispersant Structure and Ostwald Ripening

This example highlights the fact that the inventive dispersants more effectively inhibit Ostwald Ripening compared to state of the art structurally similar dispersants.

Generally, if particles with a wide range of sizes are dispersed in a medium there will be a differential rate of dissolution of the particles in the medium. The differential dissolution results in the smaller particles being thermodynamically unstable relative to the larger particles and gives rise to a flux of material from the smaller particles to the larger particles. The effect of this is that the smaller particles dissolve in the medium, while the dissolved material is deposited onto the larger particles thereby giving an increase in particle size. One such mechanism for particle growth is known as Ostwald ripening.

The growth of particles in a dispersion can result in instability of the dispersion during storage resulting in the sedimentation of particles from the dispersion. It is particularly important that the particle size in a dispersion of an active ingredient remains constant because a change in particle size is likely to affect the availability, toxicity and hence the efficacy of the ingredient.

To test and compare the inventive dispersant's effect on Ostwald ripening to that for state of the art dispersants, suspension formulations of the insecticide imidacloprid were prepared. The six selected dispersants were (refer to table 1):

Dispersant solution 2 (1:1 ratio)
Dispersant solution 6 (2:1 ratio)
Dispersant solution 10 (3:1 ratio)
Dispersant solution 14 (4:1 ratio)
Dispersant solution 18 (6:1 ratio)
Dispersant solution 22 (8:1 ratio)

Figure 2:
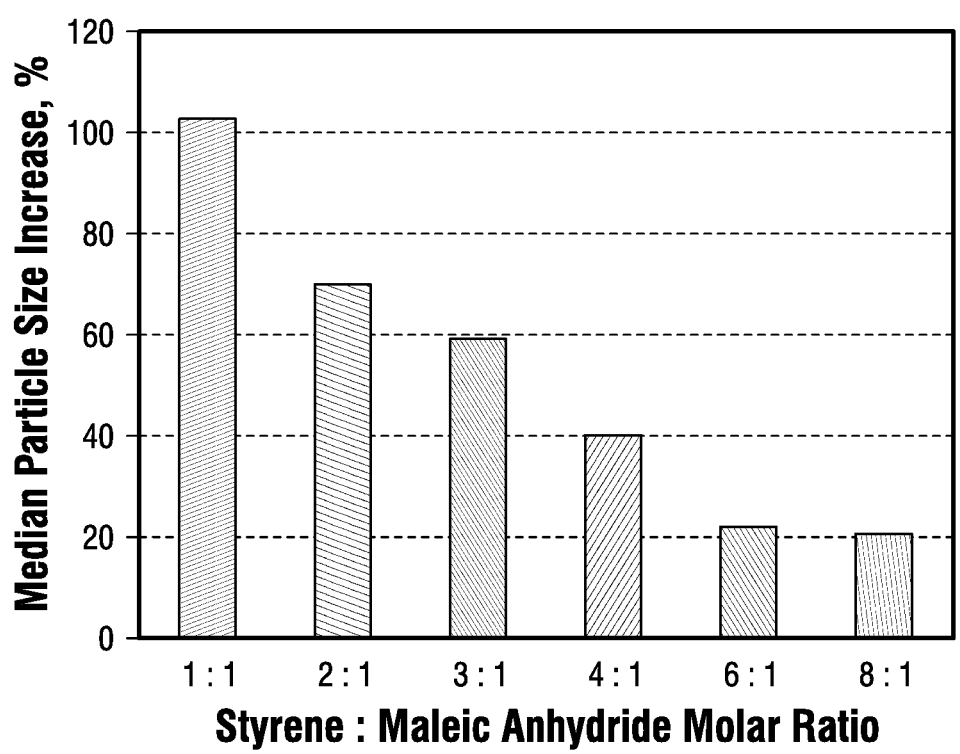
FIG. 2 depicts the median particle size increase in an agrochemical composition over time.
Figure 3:
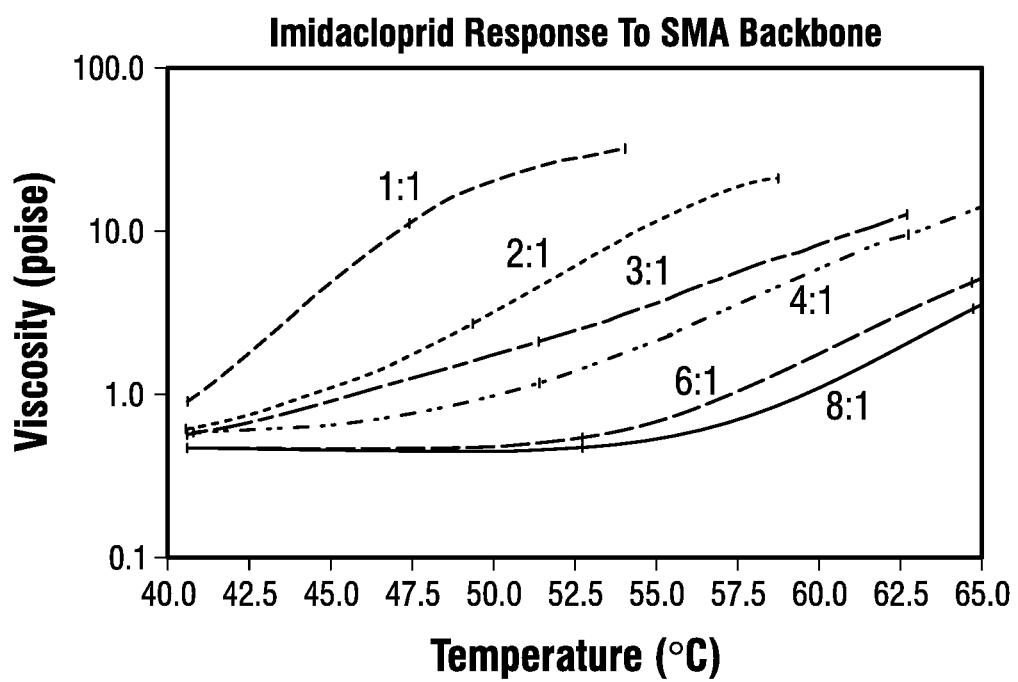
FIG. 3 depicts the effect of temperature increase on the viscosity of an agrochemical suspension.

The six formulations were prepared as follows:

Imidacloprid technical (150 grams), dispersant solution from Table 1 (7.5 grams), wetting agent (Surfonic L24-7® agent, 4.8 grams), propylene glycol (19.2 grams), and water (118.2 grams) were combined in a beaker and mixed with a spatula. The slurry was then transferred to a bead mill (Eiger Mini-100, available from EMI, Grayslake, IL) and milled for 10 minutes at 2500 rpm using 1.0 mm glass media. The slurry was discharged from the mill, and blended with a 1% solution of xanthan gum (Kelzan® S xanthan gum, available from Kelco Corporation), in a ratio of 9 parts slurry to 1 part gum solution. The initial particle size distribution was determined for each sample using a Horiba LA-300 light scattering particle size analyzer. The six suspension formulations of imidacloprid were then placed in an oven at 54° C. for 2 weeks, removed and stored at 20° C. for 10 weeks. At this time, the particle size distribution of each sample was again measured. The particle size data is tabulated in Table 4, and shown graphically in FIG. 2:

TABLE 4

| Sample | Dispersant Solution | Initial D0.1 | Initial D0.5 | Initial D0.9 | Final D0.1 | Final D0.5 | Final D0.9 | Median Increase, % |
|---|---|---|---|---|---|---|---|---|
| 1 | 2 | 1.32μ | 2.60μ | 4.96μ | 2.10μ | 5.26μ | 11.57μ | 51 |
| 2 | 6 | 1.34μ | 2.78μ | 5.84μ | 1.98μ | 4.73μ | 11.03μ | 41 |
| 3 | 10 | 1.25μ | 2.59μ | 4.93μ | 1.86μ | 4.12μ | 9.12μ | 37 |
| 4 | 14 | 1.24μ | 2.29μ | 4.02μ | 1.68μ | 3.21μ | 5.90μ | 29 |
| 5 | 18 | 1.28μ | 2.65μ | 5.19μ | 1.68μ | 3.23μ | 6.02μ | 18 |
| 6 | 22 | 1.28μ | 2.61μ | 5.00μ | 1.67μ | 3.15μ | 5.80μ | 17 |

Thus, as the above demonstrates, molar ratios of styrene to maleic anhydride of 4:1 or greater provide superior control of Ostwald ripening in agrochemical suspensions.

Example 3: Comparison of Dispersant Structure and Formulation Rheology

This example demonstrates that a high styrene:maleic anhydride molar ratio, 4:1 or greater, is necessary to prepare a dispersant with superior rheological performance in suspension concentrate compositions. In particular, during a manufacturing process, the particles of a pesticide (for e.g. technical imidacloprid) must be reduced in size to a range of 1-10 microns in a large industrial media mill. This process puts the suspension under high shear forces, and the suspension may encounter high temperatures if the mill is not cooled properly. Dispersants must be capable of successfully keeping the viscosity low during this stage of manufacturing so that it can be easily transferred from one tank to another by pumping.

The rheological properties of the six imidacloprid suspensions described in the above example 2 were analyzed using a TA Instruments AR-2000 ex rheometer, equipped with a Peltier thermal system, using a plate/plate configuration. The viscosity of the six samples were individually measured as a function of temperature, while under constant shear of 100 s-1. FIG. 3 shows the viscosity of the six imidacloprid suspensions as the temperature is raised from 40° C. to 65° C. Each curve in FIG. 3 represents one of the six suspensions made with dispersants containing different ratios of styrene to maleic anhydride. This ratio is shown next to each curve. The most effective dispersants will provide the lowest suspension-viscosity at any given temperature. From this Figure, it is evident that the best performance occurs when 4:1, 6:1, and 8:1 molar ratios of styrene to maleic anhydride were used when preparing the dispersant.

Thus, as the results demonstrate in the above Examples, the dispersants of the present disclosure can reduce many problems faced during the formulation production process and improve storage stability of the finished formulation including reducing or preventing a) paste formation that can occur at moderate temperatures during the formulation milling step, b) Ostwald ripening of the suspension during product storage, and c) poor viscosity control during milling operations at elevated temperature.

While the foregoing is directed to embodiments of the present disclosure, other and further embodiments of the disclosure may be devised without departing from the basic scope thereof, and the scope thereof is determined by the claims that follow.

The invention claimed is:

1. A non-aqueous dispersant obtained from the reaction of a styrene maleic anhydride copolymer having a styrene to maleic anhydride molar ratio of between 6.0:1.0 to 8.0:1.0 and a polyether monoamine represented by the formula 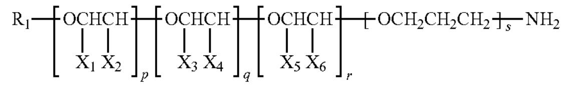 wherein $R_1$ is a hydrocarbyl group, $X_1$, $X_2$, $X_3$, are hydrogen, $X_4$ is methyl, $X_5$, and $X_6$ in each occurrence are independently selected from the group consisting of: hydrogen, methyl and ethyl, p is 19, q is 3, and r is any integer between zero and about 100, including zero, and, s is either 0 or 1 and the polyether monoamine has a molar ratio of EO to PO greater than or equal to 58/8 and is water soluble and wherein the dispersant has a total solids content, in percent of less than about 60 and more than about 45.

2. The non-aqueous dispersant of claim 1, wherein the polyether monoamine has a molecular weight between about 600 to about 3000.

3. An aqueous agricultural composition comprising the non-aqueous dispersant of claim 1 and a pesticide.

4. The aqueous agricultural composition of claim 3, wherein the non-aqueous dispersant is present in an amount from about 1%-5.5% by weight, based on the total weight of the aqueous agricultural composition.

5. The aqueous agricultural composition of claim 3, wherein the pesticide is present in an amount of up to about 70% by weight, based on the total weight of the aqueous agricultural composition.

6. A method for killing or inhibiting or repelling a pest comprising the steps of providing a pesticide in a pesticidally effective amount, providing an effective amount of the dispersant of claim 1, combining the pesticide with the dispersant and water to prepare an aqueous agrochemical formulation, and contacting the aqueous agrochemical formulation and the pest, wherein the effective amount of the dispersant is at least about 0.1% by weight based on the total weight of the aqueous agrochemical formulation.

7. A pigment, ink or dye formulation comprising the non-aqueous dispersant of claim 1.

8. A method for reducing Ostwald Ripening of an aqueous agricultural composition comprising adding the dispersant of claim 1 to the aqueous agricultural composition wherein the aqueous agricultural composition comprises a pesticidally effective amount of a pesticide.

* * * * *